(12) United States Patent
Lee (10) Patent No.: US 10,480,548 B2
(45) Date of Patent: Nov. 19, 2019

(54) HYDRAULIC ACTUATOR TO WHICH LIMIT-ADJUSTABLE MECHANICAL LOCK DEVICE IS APPLIED

(71) Applicant: Yong Jun Lee, Busan (KR)

(72) Inventor: Yong Jun Lee, Busan (KR)

( * ) Notice: Subject to any disclaimer, the term of this patent is extended or adjusted under 35 U.S.C. 154(b) by 84 days.

(21) Appl. No.: 15/539,400

(22) PCT Filed: Sep. 30, 2016

(86) PCT No.: PCT/KR2016/011022
§ 371 (c)(1),
(2) Date: Jun. 23, 2017

(87) PCT Pub. No.: WO2017/086594
PCT Pub. Date: May 26, 2017

(65) Prior Publication Data
US 2017/0363121 A1    Dec. 21, 2017

(30) Foreign Application Priority Data
Nov. 17, 2015 (KR) ........................ 10-2015-0161374

(51) Int. Cl.
*F15B 15/24* (2006.01)
*F15B 15/26* (2006.01)
(Continued)

(52) U.S. Cl.
CPC .......... *F15B 15/261* (2013.01); *F15B 15/065* (2013.01); *F15B 15/14* (2013.01);
(Continued)

(58) Field of Classification Search
CPC ...... F15B 15/261; F15B 15/065; F15B 15/24; F16K 31/12; F16K 31/1635
See application file for complete search history.

(56) References Cited

U.S. PATENT DOCUMENTS 2,609,793 A * 9/1952 Rose ......................... B60S 1/12
91/422
4,635,536 A * 1/1987 Liu ....................... F15B 15/261
92/24

(Continued)

FOREIGN PATENT DOCUMENTS

JP   11-247959    9/1999
JP   2000-199503  7/2000

(Continued)

*Primary Examiner* — Thomas E Lazo
(74) *Attorney, Agent, or Firm* — IPLA P.A.; James E. Bame (57) ABSTRACT

A hydraulic actuator to which a limit-adjustable mechanical lock device is applied, comprising: a housing having a first hole; side covers coupled at both sides of the housing, and having holder insertion holes formed to be opened toward the first hole side of the housing, and plugs; a first holder of which one side of the outer peripheral surface is inserted into the holder insertion hole at the plug side of the side cover by screw coupling; a second holder fitted and coupled to the inner peripheral surface of the side cover and having one end thereof screw-coupled to the second hole of the first holder; a locking means into which a rod is inserted so as to be movable in an axial direction at a predetermined distance across the second hole of the first holder and the third hole of the second holder.

5 Claims, 5 Drawing Sheets (51) Int. Cl.
  *F16K 31/12*   (2006.01)
  *F15B 15/14*   (2006.01)
  *F15B 15/06*   (2006.01)
  *F16K 31/163*  (2006.01)
  *F16H 19/04*   (2006.01)

(52) U.S. Cl.
  CPC .............. *F15B 15/24* (2013.01); *F16K 31/12* (2013.01); *F16K 31/1635* (2013.01); *F16H 19/04* (2013.01)

(56) References Cited

U.S. PATENT DOCUMENTS

| | | | |
|---|---|---|---|
| 6,371,439 B1 * | 4/2002 | Trevisan | F15B 15/065 251/285 |
| 6,435,072 B2 * | 8/2002 | Hirano | F01C 9/002 91/357 |
| 6,626,055 B2 * | 9/2003 | Magaribuchi | F15B 15/065 74/435 |
| 7,363,848 B2 * | 4/2008 | Hoch | F15B 15/065 92/136 |

FOREIGN PATENT DOCUMENTS

| | | |
|---|---|---|
| KR | 20010087319 | 9/2001 |
| KR | 20100005843 | 1/2010 |
| KR | 101424423 | 8/2014 |

* cited by examiner

HYDRAULIC ACTUATOR TO WHICH LIMIT-ADJUSTABLE MECHANICAL LOCK DEVICE IS APPLIED

BACKGROUND

The present invention relates to a hydraulic actuator employing a limit adjustable mechanical lock. More particularly, the present invention relates to a hydraulic actuator employing a limit adjustable mechanical lock, capable of preventing an error in the operation of a valve by removing the fine operating clearance of a valve and by stopping the operation of the valve under hydraulic pressure equal to or less than preset pressure.

In general, various valves have been employed to cut off and control the flow of a fluid. The valves are automatically or manually open or closed.

Although some of the valves have structures that may be manually manipulated, the valves are open or closed through automatic manipulation in significantly various fields.

As operating units of the valves are automatically open or closed, electrical actuators based on solenoids and hydraulic actuators based a fluid, such as air or oil, have been extensively employed.

However, the electrical actuators have been applied to small valves that do not require great operating force while the hydraulic actuators have been applied to medium and large valves.

Among them, in the case of the hydraulic actuators, significantly various operating structures have been suggested and used. In the case of the hydraulic actuators, there have been suggested a configuration in which a piston formed integrally with a rack gear is moved by a predetermined distance through hydraulic pressure to rotate a pinion gear engaged with the rack gear of the piston and a valve shaft shaft-fixed to the pinion gear, thereby rotating a valve coupled to a valve shaft such that the valve is open or closed.

However, according to the related art, in the case of the hydraulic actuator, the piston simply operating by the hydraulic pressure is rotated and the valve is open or closed by the rotational force of the piston. Even if hydraulic pressure is applied to the piston in insufficient amount, the piston may move so that errors occur in the operation of the valve.

In addition, even if a fluid passage is initially closed or open to the maximum extent by the valve, if the rack gear of the piston is engaged with the pinion gear to rotate the valve, the difference may be slightly made between the moment that the rack gear of the piston is engaged with the pinion gear and the moment that the valve is open or closed, and a fluid may leak by the difference.

SUMMARY OF THE INVENTION

Accordingly, the present invention is suggested in order to solve the above problem, and an object of the present invention is to provide a hydraulic actuator employing a limit adjustable mechanical lock, capable of preventing errors in the operation of a valve in advance by preventing the locking state of a piston from being released under preset hydraulic pressure or less.

In addition, another object of the present invention is to provide a hydraulic actuator employing a limit adjustable mechanical lock, capable of instantly operating a valve through the application of the hydraulic pressure by removing a valve clearance as the coupling degree of the valve is adjusted by inserting a cap housing receiving mechanical locking units into a main housing and screwing the cap housing with the main housing.

In order to accomplish the above objects, according to the present invention, there is provided a hydraulic actuator employing a limit adjustable mechanical lock, the hydraulic actuator including an assembly of a housing having a first hole to receive a piston, which is formed at one side thereof with a rack gear to be engaged with a pinion gear fixing a valve shaft, such that the piston is movable by a predetermined distance, wherein both opposite portions of the piston are recessed by a predetermined depth, and ball insertion grooves are formed in inner circumferential surfaces of recess parts; side covers coupled to opposite sides of the housing and having holder insertion holes to be open toward a first hole of the housing, wherein opposite end faces about the housing are screwed with plugs to block the holder insertion holes from an outside; a first holder having one side of an outer circumferential surface, which is inserted into the holder insertion hole in the side cover positioned at a side of the plug through screwing with an inner circumferential surface of the side cover, and a second hole hollowed to be open toward the first hole; a second holder having one end screwed with the second hole in the first holder while the second holder is fitted-coupled to the inner circumferential surface of the side cover, having a third hole open toward the first hole, and having an end face which is positioned at a side of the second hole and bored with an inner diameter smaller than a diameter of the second hole; a locking unit having a rod inserted into the second hole and the third hole of the first holder and the second holder, respectively, while passing through a fourth hole of the second holder such that the rod is axially movable by a predetermined distance, wherein the rod allows a ball to be inserted into a ball insertion hole of the piston or to deviate from the ball insertion hole of the piston by hydraulic pressure, which is applied to the first holder and equal to or greater than predetermined pressure, and spring elastic force to lock or unlock the piston and a fluid passage extending from the housing to each of the side covers provided at the opposite sides of the housing such that the hydraulic pressure is selectively applied to both first holes and both second holes formed in the side covers and the housing.

As described above, according to the hydraulic actuator employing the limit adjustable mechanical lock having the above configuration, when the hydraulic pressure equal to or greater than preset pressure is applied, the valve is normally operated and the operating state of the valve is locked. Accordingly, in the abnormal situation that the hydraulic pressure equal to or less than the preset pressure is applied, the operation of the valve is stopped. Therefore, the operability of the valve can be accurately and stably maintained.

In addition, according to the present invention, the coupling structure of the first holder and the second holder receiving the locking unit is screwed with the end portion of the side cover. Accordingly, the coupling structure is rotated by using a simple mechanism to restrict the moving clearance of the piston, thereby allowing limit adjustment. Accordingly, the valve can be manipulated with the accurate operating reactivity in the state that the operating clearance of the valve is removed.

DETAILED DESCRIPTION OF THE INVENTION

Hereinafter, a hydraulic actuator employing a limit adjustable mechanical lock according to an exemplary embodiment of the present invention will be described with reference to accompanying drawings.

Figure 1:
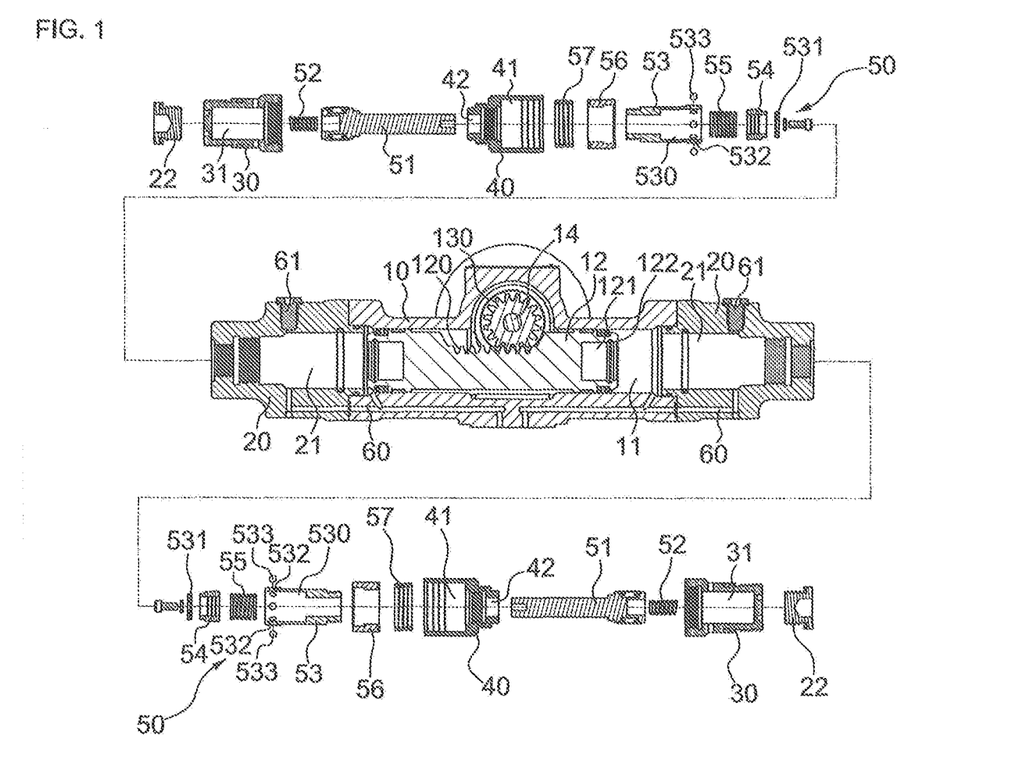
FIG. 1 is an exploded sectional view illustrating a hydraulic actuator employing a limit adjustable mechanical lock according to the present invention.
Figure 2:
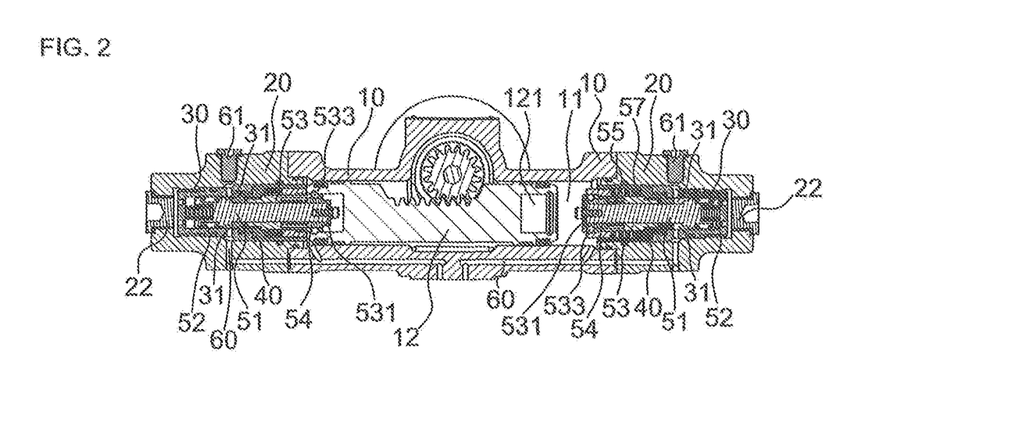
FIG. 2 is an assembling sectional view of FIG. 1.

FIG. 1 is an exploded sectional view illustrating the hydraulic actuator employing the limit adjustable mechanical lock according to the present invention, and FIG. 2 is an assembling sectional view of FIG. 1.

As illustrated in drawings, the present invention is configured with an assembly mainly including a housing 10, a side cover 20, a first holder 30, a second holder 40, a locking unit 50, and a fluid passage 60.

The housing 10 according to the present invention is formed in the shape of a tube having an inner portion that is laterally hollowed.

A piston 12 is movably inserted into a first hole 11 formed in the housing 10, a rack gear 120 is formed at one side of an outer circumferential surface of the piston 12, a pinion gear 13 is engaged with the rack gear 120 of the piston 120, and the pinion gear 13 is coupled to a valve shaft 14 having one end fixed to a valve (not illustrated).

Accordingly, when the piston 12 is selectively moved leftward or rightward inside the first hole 11 of the housing 10, the pinion gear 13 engaged with the rack gear 120 of the piston 12 is rotated while the valve shaft 14 coupled to the pinion gear 13 is rotated, so operating units, such as valves, are operated by the valve shaft 14.

In this case, both end faces of the piston 12 are recessed by a predetermined depth, thereby forming recess parts 121. A ball insertion groove 122 is formed in an inner circumferential surface of an end portion of the recess part 12.

Side covers 20 are screwed with both end portions of the housing 10, respectively.

According to the present invention, the side cover 20 has a holder insertion hole 21 hollowed to open the side cover 20 toward the first hole 11. An end face of the side cover 20 opposite to an end portion of the side cover 20 positioned at the side of the first hole 11 is laterally hollowed with a diameter less than that of the holder insertion hole 21 and screwed with a plug to block the holder insertion hole 21 from the outside.

In other words, the plug 22 is screwed with the side cover 20 such that the plug 22 is blocked from the outside.

First holders 30 and second holders 40, which are screwed with each other in series, are inserted through the holder insertion holes 21 of the both side covers 20.

In this case, the first holder 30, which has a second hole 31 hollowed to open the first holder 30 toward the first hole 11, is fixedly screwed with an inner circumferential surface of the side cover 20 at the side of the plug 22 of the holder insertion hole 21.

In other words, the first holder 30 is configured such that the first holder 30 is inserted into the holder insertion hole 21 of the side cover 20 and a portion of an outer circumferential surface of the first holder 30 is coupled to an inner circumferential surface of the holder insertion hole 21 positioned at the side of the plug 22.

In addition, the second holder 40 is coupled to an open end portion of the first holder 30.

Figure 3:
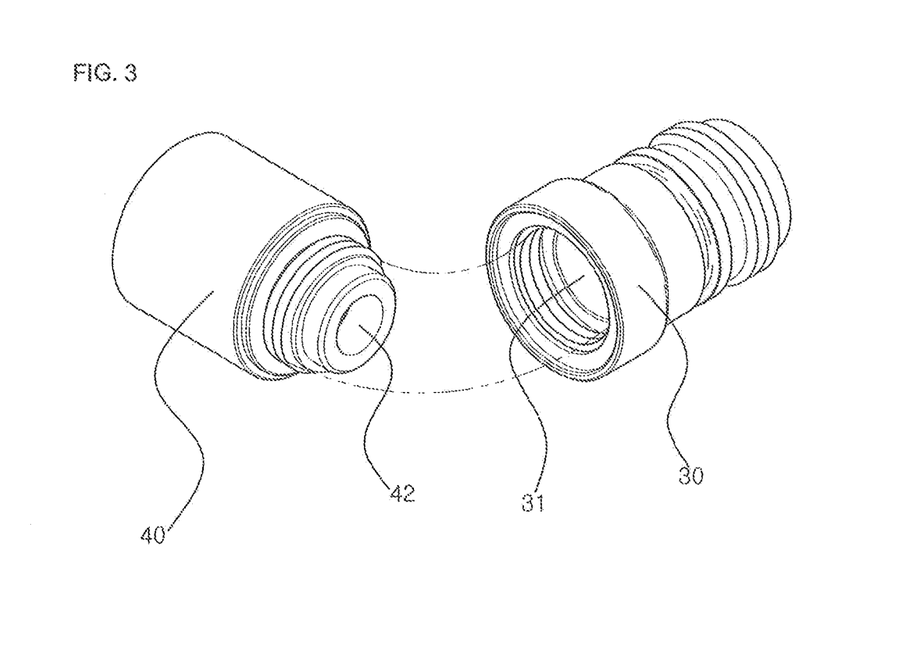
FIG. 3 is an exploded perspective view illustrating the coupling state between a first holder and a second holder in the hydraulic actuator employing the limit adjustable mechanical lock according to the present invention.

In other words, the end portion of the first holder 30 is screwed with an end portion of the second holder 40 as illustrated in FIG. 3. An outer circumferential surface of one end portion of the second holder 40 having a smaller inner diameter is screwed with an inner circumferential surface of the open end portion of the first holder 30.

In this case, similarly to the first holder 30, the second holder 40 has a third hole 41 having a diameter larger than that of the second hole 31 of the first holder 30 and formed to be open toward the first hole 11. An end face of the third hole 41 positioned at the side of the second hole 31 has a fourth hole 42 having a diameter smaller than that of the second hole 31 and passing through the second hole 31 such that the third hole 41 has a diameter reduced toward the first holder 30 and is inserted into the first holder 30.

Accordingly, in the state that the first holder 30 is screwed with the second holder 40, the first holder 30 is first inserted into the holder insertion hole 21 through the open end portion of the side cover 20 and screwed with the inner circumferential surface of the side cover 20 positioned at the side of the coupling part of the holder injection hole 21 with the plug 22, such that the first holder 30 is fixed to the side cover 20.

In this case, an outer circumferential surface of the second holder 40 is fitting-inserted into the holder injection hole 21.

A locking unit 50 is provided into the second hole 31 in the first holder 30 and the third hole 41 and the fourth hole 42 in the second holder 40.

Figure 4:
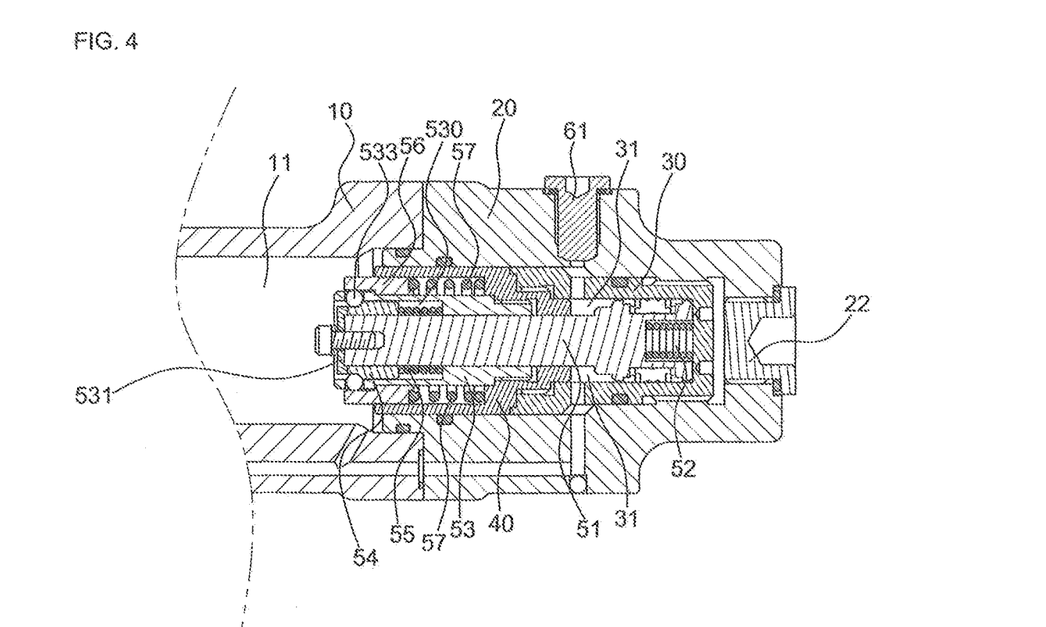
FIG. 4 is an enlarged sectional view illustrating the subject matter of the hydraulic actuator employing the limit adjustable mechanical lock according to the present invention.

FIG. 4 is an enlarged sectional view illustrating the subject matter of the hydraulic actuator employing the limit adjustable mechanical lock according to the present invention.

The locking unit 50 according to the present invention is configured with the assembly of a rod 51, a first spring 52, a ball guide 53, an inner ball guide 54, a second spring 55, an outer ball guide 56, and a third spring 57.

In other words, the rod 51 of the locking unit 50 has an outer diameter smaller than an inner diameter of the fourth hole 42 to be locked to the first holder 30 and the second holder 40 through the fourth hole 42 such that the rod 51 is axially movable.

A locking step 510 is formed on an outer circumferential surface of the rod 51 positioned at the side of the second hole 31, so an end portion of the rod 51 positioned at the side of the first holder 30 and inserted into the second hole 31 has a length shorter than that of the second hole 31.

Figure 5:
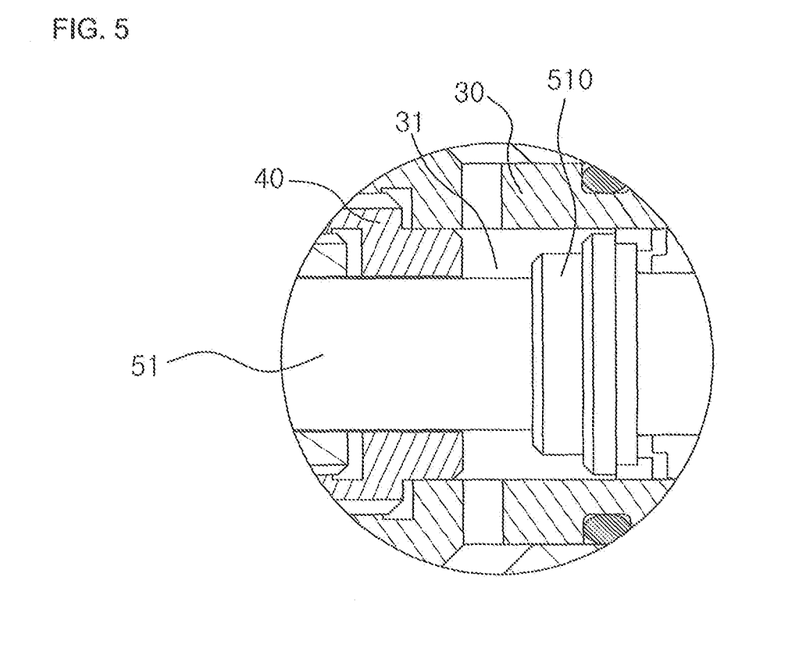
FIG. 5 is an enlarged view illustrating the subject matter of the structure that a locking step is formed on a rod in the hydraulic actuator employing the limit adjustable mechanical lock according to the present invention.

A predetermined widthwise portion of the locking step 510 of the rod 51 has an outer diameter larger than that of the fourth hole 42. Preferably, the locking step 510 of the rod 51 is formed in at least two stages to form a space having a predetermined width for introducing hydraulic pressure in association with an end face of the second holder 40 as illustrated in FIG. 5.

The end portion of the rod 51, which is positioned at the side of the first holder 30 and inserted into the second hole 31, is elastically supported by the first spring 52.

In addition, an inner circumferential surface of the third hole 41, which is positioned at the side of the fourth hole 42 of the second holder 40, is screwed with an end portion of an outer circumferential surface of the ball guide 53.

In this case, the center of the ball guide 53 is bored with a diameter larger than an outer diameter of the rod 51 such that the rod 51 is slidable and an inner diameter of a portion of the ball guide 53, which is positioned at the side of the first hole 11, is more widely enlarged along a predetermined length, thereby forming a guide groove 530.

The second spring 55 is inserted into the guide groove 530 of the ball guide 53 together with the inner ball guide 54, and the inner ball guide 54 elastically supported by the second spring 55 is prevented from deviating from an end portion of the rod 51, which is positioned at the side of the first hole 11, by a stop ring 531.

A plurality of ball insertion holes 532 are formed along an outer circumferential surface of an end portion of the ball guide 53, which is positioned at the side of the first hole 11, at regular intervals, and balls 533 having smaller diameters are inserted into the ball insertion holes 532, respectively.

The outer circumferential surface of the ball guide 53, which has the guide groove 530, is formed with a thickness smaller than the diameter of the ball 533. An end portion of the ball guide 533, which includes the ball insertion holes 532 and is positioned at the side of the first hole 11, has an outer diameter more expanded by a predetermined thickness.

In addition, an outer circumferential surface of the inner ball guide 54 to be inserted into the guide groove 530 is slidably inserted into the guide groove 530 along an inner circumferential surface of the ball guide 53.

More preferably, in the inner ball guide 54, the outer circumferential surface of a predetermined length at the side of the first hole 11 has a smaller diameter, and a boundary surface stepped between outer circumferential surfaces of the inner ball guide 54 is gently inclined.

In particular, a predetermined widthwise portion of the ball guide 53 has an outer diameter which is smaller than that of an inner diameter of the third hole 41 of the second holder 40. Accordingly, the outer ball guide 56 and the third spring 57 are interposed between the inner circumferential surface of the second holder 40 and the outer circumferential surface of the ball guide 53.

The outer ball guide 56 supported by the third spring 57 has a predetermined length and an inner diameter enlarged corresponding to the length such that an end portion of the outer ball guide 56 at the side of the first hole 11 has an outer diameter larger than that of the ball guide 53, so the outer ball guide 56 slidably moves along the outer circumferential surface of the end portion of the ball guide 53 at the side of the first hole 11.

Accordingly, as a portion of the outer ball guide 56, which is positioned at the side of the first hole 11 and has a partially enlarged inner diameter, is locked to an end portion of the ball guide 53 having an enlarged outer diameter, the outer ball guide 56 is prevented from deviating from the ball guide 53 toward the first hole 11.

In addition, in the state that the balls 533 provided in the ball guide 53 are inserted into the ball insertion holes 532, the balls 533 internally touches the outer circumferential surface of the end portion of the inner ball guide 54, which is supported by the second spring 55, the outer circumferential surface having an enlarged outer diameter. In this state, the balls 533 externally touches an inner circumferential surface of an end portion of the outer ball guide 56 supported by the third spring 57, the inner circumferential surface having an enlarged inner diameter and being positioned at the side of the first hole 11. Accordingly, the balls 533 are prevented from deviating from the ball guide 53.

However, in the locking unit 50 according to the present invention, the end portion of the outer ball guide 56, which is positioned at the side of the first hole 11, is horizontally formed in line with an end portion of the outer ball guide 56 which is positioned at the side of a recess part 121 of the piston 12. Accordingly, the outer ball guide 56 slides by the piston 12 and the third spring 57.

Meanwhile, as illustrated in FIG. 2, according to the present invention, a fluid passage 60 is formed in the housing 10, the side cover 20, and the first holder 30 such that a fluid is supplied to the first hole 11, which is positioned at the front end of the second holder 40, via the housing 10 and the second hole 31 provided in the first holder 30 through each of side covers 20.

In other words, the fluid passage 60 is to supply and discharge the fluid through both side covers 20. The fluid supplied to the second hole 31 provided in the second holder 40 may be supplied to the first hole 11 through the side cover 20 and the housing 10.

Hydraulic pressure is selectively applied to both side covers 20. Accordingly, if hydraulic pressure is applied to one side cover 20, the hydraulic pressure is discharged from an opposite side cover 20 while the piston 12 is moving inside the first hole 11.

Meanwhile, according to the present invention, the first holder 30, the second holder 40, and the ball guide 53 have cylindrical shapes. The inner ball guide 54 and the outer ball guide 56 inserted into the guide groove 530 and the second hole 40, respectively, have ring shapes.

Reference numeral 61, which is not described yet, represents a fluid stopper coupled to open an emergency fluid passage for arbitrarily applying normal hydraulic pressure when the operation of the valve is stopped as abnormal hydraulic pressure is applied to the second hole 31.

Hereinafter, the hydraulic actuator employing the limit adjustable mechanical lock according to the present invention will be described in terms of operations and effects.

According to the present invention, for an assembling work, the piston 12 is first inserted into the housing 10, the pinion gear 13 fixed to the valve shaft 14 is engaged with the rack gear 120 of the piston 12.

Then, the third spring 57 and the outer ball guide 56 are sequentially inserted into the second holder 40 along an inner circumferential surface of the third hole 41, and the rod 51 is coupled to the resultant structure through the fourth hole 42 of the second holder 40.

In this case, a portion of the rod 51, which has a longer length about the locking step 510, is inserted toward the third hole 41 through the fourth hole 42, and the ball guide 53 is inserted into the third hole 41 in the second holder 40.

However, the ball guide 53 is screwed with the inner circumferential surface of the third hole 41 in the second holder 40 to be securely fixed to the second holder 40.

In this case, the end portion of the ball guide 53 having the more expanded outer diameter prevents the outer ball guide 56, which is slidably fitted around the ball guide 53 along the outer circumferential surface of the ball guide 53, from deviating from the ball guide 53.

After the second spring 55 and the inner ball guide 54 are sequentially inserted into the guide groove 530 while being interposed between the outer circumferential surface of the rod 51 and the ball guide 53, the stop ring 531 is coupled to the end portion of the rod 51, thereby preventing the inner ball guide 54 from deviating from the guide groove 530 to the outside.

The second holder 40 is inserted into the first holder 30 while the first spring 52 is inserted into an end portion of the rod 51 which partially protrudes through the fourth hole 42. Accordingly, as illustrated in FIG. 3, the end portion of the first holder 30 is screwed with the end portion of the second holder 40.

The first holder 30 and the second holder 40, which are integrally screwed with each other, are inserted into the holder insertion hole 21 in the side cover 20, and the end portion of the outer circumferential surface of the first holder 30 is screwed with an inner circumferential surface of the holder insertion hole 21.

The side covers 20 having the assembly of the first holder 30, the second holder 40, and the locking unit 50 are screwed with both end portions of the housing 10, thereby completing the assembling work according to the present invention.

However, the operating unit, such as a valve, has an opening and closing angle of 90°. Accordingly, in the state that the valve is first closed, one end portion of the piston 12 pushes the outer ball guide 56 by a predetermined length, and the balls 533 are inserted into the ball insertion part 122 formed in the recess part 121 of the piston 12 inside the first hole 11 of the housing 10.

If the balls 533 are inserted into the ball insertion part 122 of the piston 12, the piston 12 becomes in a locking state in which the piston 12 is not moved any more.

Figure 6:
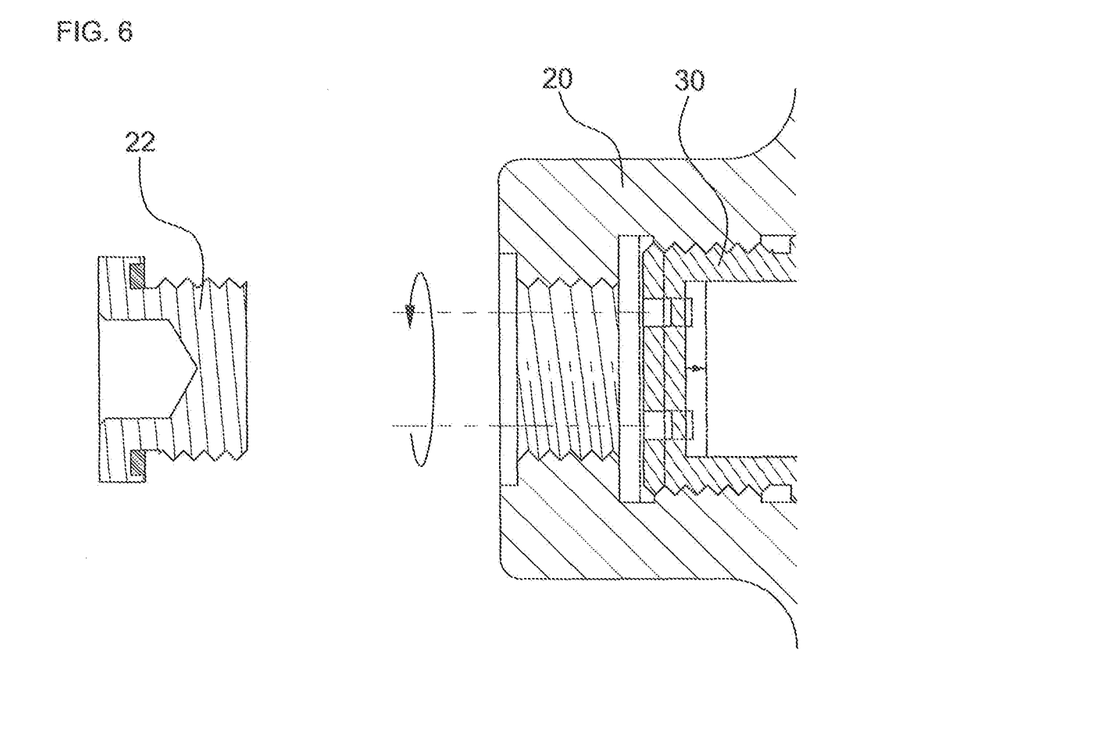
FIG. 6 is a view illustrating the structure of adjusting the limit using the first holder in the hydraulic actuator employing the limit adjustable mechanical lock according to the present invention.

In this case, at the side cover 20 having the locked piston 12, the first holder 30 is rotated by using an additional tool through a hole having no the plug 22 as illustrated in FIG. 6.

Since the first holder 30 has been already screwed with the side cover 20, if the first holder 30 is rotated, the first holder 30 is axially slightly moved.

In addition, since even the second holder 40 is screwed with the first holder 30, when the first holder 30 is moved, even the second holder 40 is moved while rotating.

If the second holder 40 is moved and the end portion of the second holder 40 makes close contact with the end portion of the piston 12, the first holder 30 is not rotated any more. In this state, a zero point of the piston 12 is made.

If the zero point is made in which the valve is closed as the second holder 40 makes close contact with the piston 12 inside one first hole 11, the first holder 30 is rotated by using an additional tool through a hole without the plug 22 even at an opposite side cover 20.

In this case, regarding the moving length of the first holder 30 at the opposite side cover 20, since a proper moving degree of the first holder 30 is set when a design for a manufacturing work is made, the first holder 30 at the opposite side may be moved only by the length set when the design is made.

However, after the moving distance of the piston 12 is accurately restricted by manipulating the rotation of both first holders 30, both holes into which the tools are inserted are screwed with the plugs 22 to be blocked from the outside.

Accordingly, if the rotation of the both first holders 30 is manipulated such that the moving clearance of the piston is removed, when the piston 12 is moved by the hydraulic pressure, the operating clearance of the valve is removed, so that the operability of the valve can be accurately implemented.

After the above assembling work is completed, hydraulic pressure having a predetermined size is selectively applied to the second holes 31 of the first holders 30 through the fluid passages 60 in both side covers 20.

Figure 7:
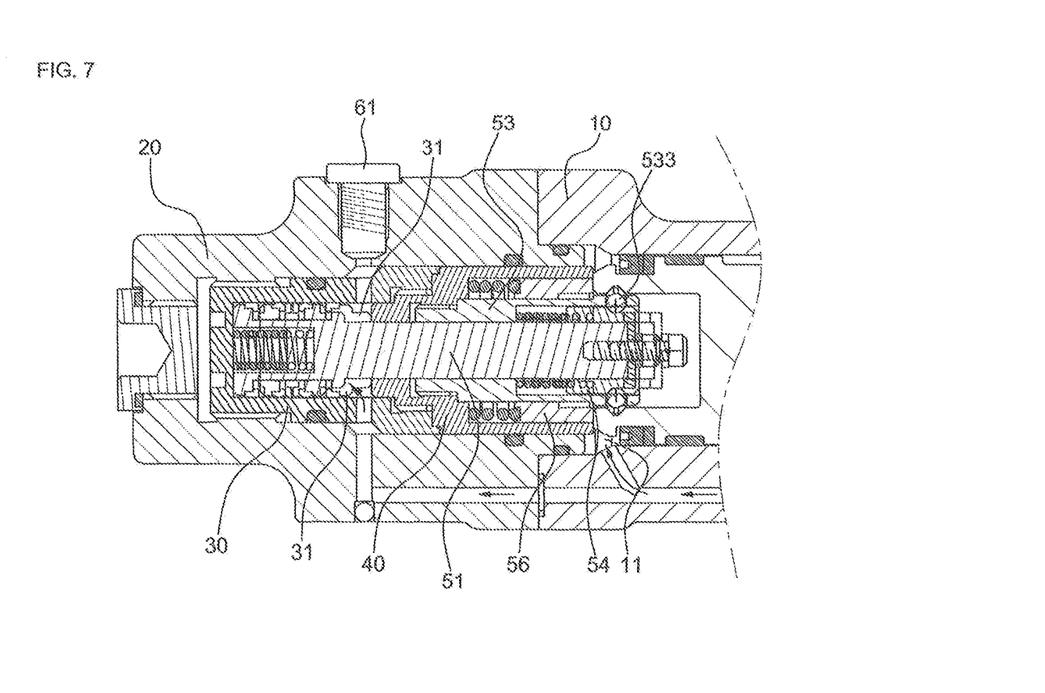
FIG. 7 is an operation state view illustrating that the locking state of the piston is released as the hydraulic pressure is applied in the hydraulic actuator employing the limit adjustable mechanical lock.

FIG. 7 is an operation state view illustrating that the locking state of the piston is released as the hydraulic pressure is applied in the hydraulic actuator employing the limit adjustable mechanical lock.

As illustrated in drawings, if hydraulic pressure equal to or greater than predetermined pressure is applied to one side of the housing 10, the hydraulic pressure is applied to the locked second hole 31 of the piston 12 together with the first hole 11.

If the rod 51 is moved backward while compressing the first spring 52 by the hydraulic pressure applied to the second hole 31, as the shaft-fixed inner ball guide 54 prevented from deviating by the stop ring 531 compresses the second spring 55 at the front end of the rod 51, the balls 533 inserted into the ball insertion holes 532 of the ball guide 53 internally touches the outer circumferential surface of the inner ball guide 54 having a reduced outer diameter.

Accordingly, if the balls 533 become in a movable state in the ball insertion part 122 of the piston 12 as the rode 51 is moved backward, the piston 12 is pushed by the hydraulic pressure applied to the first hole 11. In this case, the balls 533 in the ball insertion part 122 of the piston 12 make close contact with the outer circumferential surface of the inner ball guide 54 having the reduced outer diameter, such that the locking state of the piston 12 is released.

Figure 8:
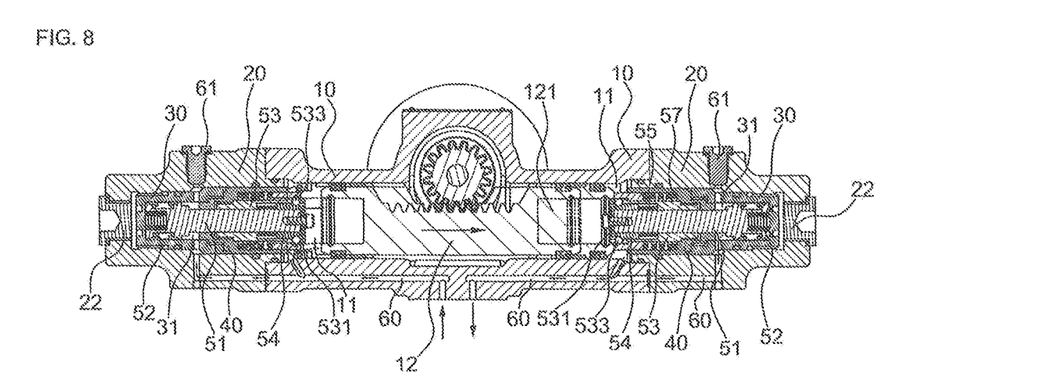
FIG. 8 is an operation state view illustrating that the piston is moved as hydraulic pressure is applied to a first hole in the hydraulic actuator employing the limit adjustable mechanical lock according to the present invention.

FIG. 8 is an operation state view illustrating that the piston is moved as the hydraulic pressure is applied to the first hole in the hydraulic actuator employing the limit adjustable mechanical lock according to the present invention.

While the locking state of the piston 12 is released, the piston 12 is moved by the hydraulic pressure, and even the outer ball guide 56 in end-to-end contact with the piston 12 is moved while maintaining the contact state with the piston 12 and provided at a position of the piston 12, thereby preventing the balls 533 from deviating from the place thereof.

The piston 12, which is unlocked from the ball guide 53, is moved in an opposite direction by the hydraulic pressure applied to the first hole 11.

The unlocked piston 12 in the first hole 11 at one side may be moved while the fluid is discharged from the first hole 11 and the second hole 31 at the opposite side.

Figure 9:
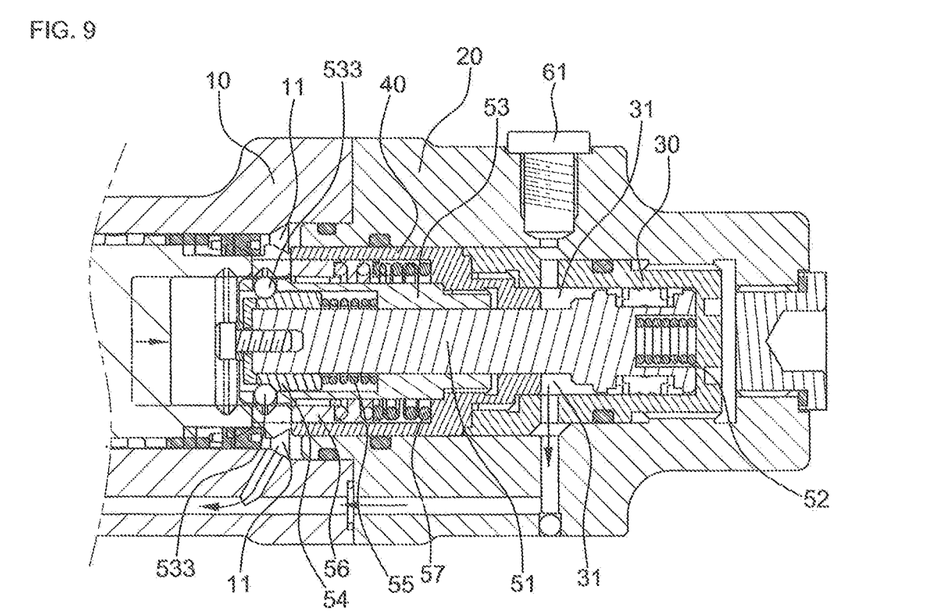
FIG. 9 is an operating state view illustrating that an outer ball guide is moved as the piston is moved in the hydraulic actuator employing the limit adjustable mechanical lock according to the present invention.

FIG. 9 is an operating state view illustrating that the outer ball guide is moved as the piston is moved in the hydraulic actuator employing the limit adjustable mechanical lock according to the present invention.

As illustrated in drawings, an opposite end portions of the piston 12 moving by the hydraulic pressure makes end-toend contact with the outer ball guide 56 externally touching the balls 533 of the ball guide 53 while moving the outer ball guide 56.

If the end portion of the piston 12 becomes in the close contact with the end portion of the second holder 40 by moving the outer ball guide 56 together with the piston 12, the piston 12 is not moved any more. In this case, the ball insertion part 122 formed in the recess part 121 of the piston 12 is vertically positioned in line with the balls 533 of the ball guide 53.

Figure 10:
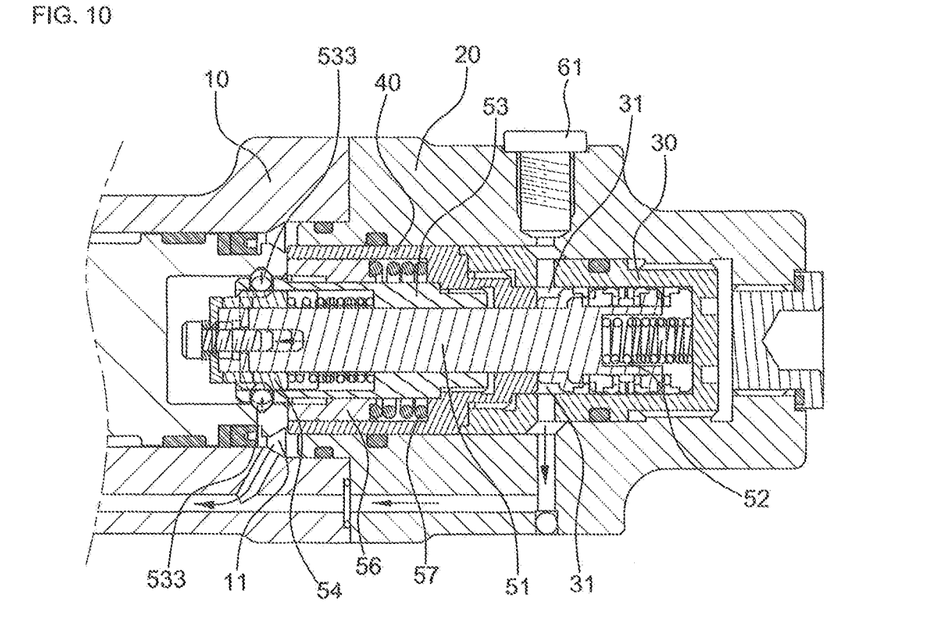
FIG. 10 is an operating state view illustrating that the piston is locked by the hydraulic actuator employing the limit adjustable mechanical lock according to the present invention.

FIG. 10 is an operating state view illustrating that the piston is locked by the hydraulic actuator employing the limit adjustable mechanical lock according to the present invention.

If the hydraulic pressure is simultaneously removed from the first hole 11 and the second hole 31, the rod 51 is moved by the elastic force of the first spring 52.

The locking step 510 of the rod 51, which is formed at the side of the second hole 31, is moved until the locking step 510 makes close contact with the end face of the second holder 40. When the rod 51 is moved, the inner ball guide 54 supported on the front end of the rod 51 is simultaneously moved toward the first hole 11 by the elastic force of the second spring 55.

As the inner ball guide 54 is moved, the balls 533, which internally touch the outer circumferential surface of the inner ball guide 54 having the smaller outer diameter, slide the stepped portion of the inner ball guide 54, which is inclined, and internally touch the outer circumferential surface of the inner ball guide 54 having the larger outer diameter.

In this manner, the balls 533 are pushed outward from the outer circumferential surface of the inner ball guide 54 having the smaller outer diameter while sliding along the stepped and inclined surface of the inner ball guide 54 such that some of the balls 533 are inserted into the ball insertion part 122 of the piston 12 vertically positioned in line with the balls 533.

Accordingly, if the balls 533 are in contact with the outer circumferential surface of the inner ball guide 54 having the larger outer diameter as the rod 51 is moved, the balls 533 are simultaneously inserted into the ball insertion part 122 of the piston 12 through the outer circumferential surface of the inner ball guide 54 having the larger outer diameter and the ball insertion holes 532 of the ball guide 53. Accordingly, the piston 12 is not moved and is locked.

If the piston 12 is locked as described above, the valve serving as the operating unit is open. Accordingly, the fluid cut off by the valve can move.

Meanwhile, in order to close the valve again, the hydraulic pressure is applied to the side cover 20 in which the piston 12 is locked, thereby unlocking the piston 12 while moving the piston 12. Accordingly, the valve is operated through the rotation of the pinion gear 13 engaged with the rack gear 120 of the piston 12.

By the hydraulic actuator employing the limit adjustable mechanical lock of the present invention, if the hydraulic pressure is selectively applied to both side covers 20, since the piston is locked in the first hole 11 through which the hydraulic pressure is released, the operations of operation units, such as the valve, are exactly performed.

In particular, in the state that the valve is open or closed, if the piston 12 is locked such that the piston 12 is not moved, the open/closed state of the valve can be stably maintained.

Accordingly, in the state that the valve is open, if hydraulic pressure, which is equal to or less than preset pressure, is applied to a valve actuator according to present invention due to the failure of a hydraulic circuit, the locking state of the piston 12 is not released and thus the valve is not operated any more. Accordingly, the error in the operation of the valve does not occur.

In other words, if the hydraulic pressure applied to the valve actuator becomes less than the preset value, the valve actuator and the valve are not operated.

Accordingly, due to the above-described action, when the circuit of the hydraulic pressure applied to the valve actuator is failed, the operation of the valve is stopped such that the abnormal operation of the valve can be prevented in advance.

Meanwhile, according to the present invention, when the valve actuator is initially assembled, since the operating limit of the valve can be simply adjusted by rotating the first holder 30, the moving clearance of the valve is removed, so the operability of the valve can be accurately provided.

As described above, according to the present invention, the moving clearance of the valve is removed by the simple rotation of the first holder 30 such that valve is accurately operated. In addition, if the hydraulic pressure applied to the side cover 20 becomes less than preset pressure as the hydraulic circuit is failed during the operation of the valve, the operation of the valve is stopped according to the present invention, so that the accident resulting from the error in the operation of the valve can be prevented in advance.

The invention claimed is:

1. A hydraulic actuator employing a limit adjustable mechanical lock, the hydraulic actuator comprising an assembly of
   a housing having a first hole to receive a piston, which is formed at one side thereof with a rack gear to be engaged with a pinion gear fixing a valve shaft, such that the piston is movable by a predetermined distance, wherein both opposite portions of the piston are recessed by a predetermined depth, and ball insertion grooves are formed in inner circumferential surfaces of recess parts,
   side covers coupled to opposite sides of the housing and having holder insertion holes to be open toward a first hole of the housing, wherein opposite end faces about the housing are screwed with plugs to block the holder insertion holes from an outside,
   a first holder having one side of an outer circumferential surface, which is inserted into the holder insertion hole in the side cover positioned at a side of the plug through screwing with an inner circumferential surface of the side cover, and a second hole hollowed to be open toward the first hole, wherein hydraulic pressure is introduced or discharged through the second hole,
   a second holder having one end screwed with the second hole in the first holder while the second holder is fitted-coupled to the inner circumferential surface of the side cover, having a third hole open toward the first hole, and having an end face which is positioned at a side of the second hole and bored with an inner diameter smaller than a diameter of the second hole,
   a locking unit having a rod inserted into the second hole and the third hole of the first holder and the second holder, respectively, while passing through a fourth hole of the second holder such that the rod is axially movable by a predetermined distance, wherein the rod allows a ball to be inserted into a ball insertion hole of the piston or to deviate from the ball insertion hole by hydraulic pressure, which is applied to the first holder and equal to or greater than predetermined pressure, or spring elastic force, to lock or unlock the piston, and a fluid passage extending from the housing to each of the side covers provided at the opposite sides of the housing such that the hydraulic pressure is selectively applied to first holes and second holes formed in both sides of the side covers and the housing.

2. The hydraulic actuator of claim 1, wherein the locking unit comprises an assembly of the rod provided in the first holder and the second holder such that the rod is axially movable, and having a locking step formed on an outer circumferential surface of one portion of the rod inserted into the second hole to axially move by the predetermined distance by a first spring elastically mounted in an end portion positioned at the side of the second hole or the hydraulic pressure applied to the second hole, a ball guide allowing the rod to pass through the second holder, wherein an end portion of an outer circumferential surface of the ball guide is screwed with an inner circumferential surface of the second holder, which is positioned at a side of the fourth hole, and one end portion of the outer circumferential surface of the ball guide, which is positioned at a side of the first hole, has a plurality of balls arranged at regular intervals, an inner ball guide inserted into a guide groove formed to expand an inner diameter of the end portion of the ball guide, which is positioned at the side of the first hole, along a predetermined length, shaft-supported on a front end of the rod, which is positioned at the side of the second hole, to be prevented from deviating from the guide groove by a stop ring, and elastically supported toward the stop ring by a second spring, and an outer ball guide axially movably interposed between the outer circumferential surface of the ball guide and the inner circumferential surface of the second holder, preventing from deviating from a front end of the ball guide, and elastically supported toward the first hole by a third spring.

3. The hydraulic actuator of claim 2, wherein the locking step of the rod is formed in at least two stages such that an outer circumferential surface of the rod, which is inserted into the second hole, is greater than the fourth hole and a space having a predetermined width is formed in association with an end face of the second holder to introduce the hydraulic pressure.

4. The hydraulic actuator of claim 2, wherein the ball guide includes a portion, into which the balls are inserted, from an end portion of the housing at the side of the first hole such that an outer diameter of an outer circumferential surface, which has a predetermined length, of the ball guide is more expanded, and wherein an inner diameter of an inner circumferential surface of the outer ball guide is expanded along a predetermined length corresponding to the outer circumferential surface of the ball guide having the outer diameter expanded from the end portion of the housing at the side of the first hole.

5. The hydraulic actuator of claim 2, wherein the inner ball guide is configured such that an outer circumferential surface of an end portion thereof, which is supported by a stop ring, has a smaller outer diameter along a predetermined length, and a boundary surface stepped between outer circumferential surfaces is gently inclined.

* * * * *